UNITED STATES PATENT OFFICE.

LOUIS BENDA, OF MAINKUR, NEAR FRANKFORT-ON-THE-MAIN, GERMANY, ASSIGNOR TO LEOPOLD CASSELLA & CO. GESELLSCHAFT MIT BESCHRÄNKTER HAFTUNG, A CORPORATION OF GERMANY.

ARSENICAL COMPOUND OF THE ACRIDINE SERIES AND PROCESS OF MAKING THE SAME.

1,408,974.   Specification of Letters Patent.   Patented Mar. 7, 1922.

No Drawing.   Application filed July 14, 1921.   Serial No. 484,783.

*To all whom it may concern:*

Be it known that I, LOUIS BENDA, a subject of the Swiss Republic, residing at Mainkur, near Frankfort-on-the-Main, Germany, have invented Arsenical Compounds of the Acridine Series and Processes of Making the Same, (for which I have filed an application in Germany Feb. 19, 1920,) of which the following is a full description.

While diazotized diaminoacridines, as for instance the 3.6-diaminoacridine in combination with sodium arsenite, produce only very small quantities of arsinic acids these are, quite unexpectedly, to be obtained in a comparatively good yield from the 10-alkylacridinium compounds.

These new arsenical compounds possess remarkably small poisonous properties. Experiments at the Institute of Experimental Therapy, under the supervision of Professor Kolle, for instance, have shown that the arsinic acid obtained from trypaflavine shows toxic effects only in a dose from upwards of a 1 ccm. solution of 1:250 per 20 gr. mouse and is still very well borne in a concentration of 1:500 (1 ccm.), while of the trypaflavine free from arsenic only 1 ccm. of a solution of 1:4000 (one to four thousand) per 20 gr. mouse should be administered.

This extremely slight poisonous quality of the new arsenical compounds renders them very well adapted for therapeutical purposes, especially also as a tonic, in anæmia, chlorosis and various kinds of debility.

Example: 52 gr. 3.6-diamino-10-methylacridinumchloride are dissolved in 1 liter hot water, and 500 gr. ice and 200 ccm. normal nitrite solution are added to the liquid when cooled down. At 2–3° C. 100 ccm. of hydrochloric acid (ten times normal) are added in one portion and a solution of 100 gr. sodium arsenite in 200 ccm. water and 60 ccm. soda lye (ten times normal) poured into the deep violet liquid, whilst stirring vigorously. The reaction takes place with much frothing; the liquid is stirred for about 2 hours, thereupon boiled up and filtered off. While still warm the precipitate is slightly acidulated with hydrochloric acid. The precipitated crude arsinic acid is then separated and purified by adding it to a solution of double normal acetate of soda and, after filtering, precipitated again by means of hydrochloric acid.

The arsenic acid so obtained forms a red-brown powder, very difficult to dissolve in water and hardly soluble in alcohol; in potash-lye, soda, and acetate of soda solution it dissolves readily, it will likewise dissolve in an excess of acid.

The diazo compound is of a red-brown colour; in combination with R salt it produces red and with resorcine orange-yellow shades.

If in the aforestated example the 3.6-diamino-10-methylacridiniumchloride is substituted by the equivalent quantity of an homologous or analogous aminoacridinium compound substances of similar properties are obtained.

Having now particularly described and ascertained the nature of my said invention and in what manner the same is to be performed, I declare, that what I claim is:

1. A process for the production of arsinic acids of the acridine series, by treating the diazo compounds of amino-10-alkylacridinium compounds with arsenites.

2. As new substances the products obtained by treating diazo compounds of amino-10-alkylacridinium compounds with arsenites.

3. As a new substance the product obtained by treating the diazo compound of 3.6-diamino-10-methylacridiniumchloride with sodium arsenite, forming in the dry state a red-brown powder, very sparingly soluble in water and hardly soluble in alcohol, dissolving readily in potash-lye, soda and acetate of soda solution and being likewise soluble in an excess of acid, being transformed by nitrous acid into a red-brown diazo compound, which yields, when combined with R-salt, red shades, with resorcinol orange-red shades.

In witness whereof I have hereunto signed my name this 16th day of June, 1921, in the presence of two subscribing witnesses.

DR. LOUIS BENDA.

Witnesses:
FRITZ HAAB,
AUGUST SCHWALLY.